(12) United States Patent
Herren et al.

(10) Patent No.: US 12,076,926 B2
(45) Date of Patent: Sep. 3, 2024

(54) SYSTEMS AND METHODS FOR THREE DIMENSIONAL PRINTING USING MICROWAVE ASSISTED DEPOSITION

(71) Applicant: Raven Space Systems, Inc., Kansas City, KS (US)

(72) Inventors: Blake Herren, Norman, OK (US); Ryan J. Cowdrey, Kansas City, KS (US); John F. Gerling, Modesto, CA (US)

(73) Assignee: Raven Space Systems, Inc., Kansas City, KS (US)

( * ) Notice: Subject to any disclaimer, the term of this patent is extended or adjusted under 35 U.S.C. 154(b) by 0 days.

(21) Appl. No.: 17/547,004

(22) Filed: Dec. 9, 2021

(65) Prior Publication Data

US 2022/0184890 A1 Jun. 16, 2022

Related U.S. Application Data

(60) Provisional application No. 63/124,613, filed on Dec. 11, 2020.

(51) Int. Cl.
*B29C 64/291* (2017.01)
*B29C 64/165* (2017.01)
*B29C 64/209* (2017.01)
*B29C 64/336* (2017.01)
*B29C 64/393* (2017.01)
*B33Y 30/00* (2015.01)
*B33Y 50/02* (2015.01)
(Continued)

(52) U.S. Cl.
CPC .......... *B29C 64/291* (2017.08); *B29C 64/165* (2017.08); *B29C 64/209* (2017.08); *B29C 64/336* (2017.08); *B29C 64/393* (2017.08); *B33Y 30/00* (2014.12); *B33Y 50/02* (2014.12); *B33Y 70/10* (2020.01); *B29C 64/106* (2017.08); *B29C 64/295* (2017.08); *B29K 2063/00* (2013.01); *B29K 2307/04* (2013.01)

(58) Field of Classification Search
CPC ... B29C 64/291; B29C 64/209; B29C 64/393; B29C 64/165; B29C 64/336; B29C 64/295; B29C 64/106; B33Y 30/00; B33Y 50/02; B33Y 70/10; B29K 2063/00; B29K 2307/04
USPC ........................................................ 425/113
See application file for complete search history.

(56) References Cited

U.S. PATENT DOCUMENTS 5,948,194 A 9/1999 Hill et al.
9,511,543 B2 12/2016 Tyler
(Continued)

FOREIGN PATENT DOCUMENTS

WO 2020188075 A1 9/2020

*Primary Examiner* — Galen H Hauth
*Assistant Examiner* — Lawrence D. Hohenbrink, Jr.
(74) *Attorney, Agent, or Firm* — Justin R. Jackson; Daniel Berenger-Russell; Peacock Law P.C.

(57) ABSTRACT

Systems and methods for three-dimensional printing using microwave assisted deposition are disclosed herein. An example device includes a reservoir of carbonaceous nanocomposite thermoset, a microwave resonance cavity that cures the carbonaceous nanocomposite thermoset, and a sensor to measure the extrusion temperature of the resin when curing the carbonaceous nanocomposite thermoset at the point of deposition during extrusion-based 3D printing.

24 Claims, 8 Drawing Sheets

(51) Int. Cl.
  *B33Y 70/10*    (2020.01)
  *B29C 64/106*   (2017.01)
  *B29C 64/295*   (2017.01)
  *B29K 63/00*    (2006.01)
  *B29K 307/04*   (2006.01)

(56) References Cited

U.S. PATENT DOCUMENTS

| | | |
|---|---|---|
| 9,578,695 B2 | 2/2017 | Jerby et al. |
| 10,744,708 B2 | 8/2020 | Tyler |
| 10,759,109 B2 | 9/2020 | Tyler |
| 11,173,660 B2 | 11/2021 | Tyler |
| 11,420,386 B2 | 8/2022 | Lee |
| 11,577,455 B2 | 2/2023 | Tyler |
| 11,584,069 B2 | 2/2023 | Tyler |
| 11,590,699 B2 | 2/2023 | Tyler |
| 2014/0021171 A1* | 1/2014 | Jerby ............... B33Y 10/00 219/76.1 |
| 2018/0193922 A1* | 7/2018 | Bell ................ B22F 10/50 |
| 2019/0291364 A1* | 9/2019 | O'Connor .......... B29C 70/58 |
| 2020/0009850 A1 | 1/2020 | Sweeney et al. |
| 2020/0215813 A1 | 7/2020 | Duersen et al. |
| 2021/0039306 A1* | 2/2021 | Busbee ............. B29C 64/209 |
| 2022/0193994 A1* | 6/2022 | Li ................... B29C 35/0805 |

\* cited by examiner

SYSTEMS AND METHODS FOR THREE DIMENSIONAL PRINTING USING MICROWAVE ASSISTED DEPOSITION

CROSS REFERENCE TO RELATED APPLICATION(S)

This application claims the benefit and priority of U.S. Provisional Application Ser. No. 63/124,613, filed on Dec. 11, 2020, which is hereby incorporated by reference herein in its entirety, including all appendices and references cited therein, as if fully set forth herein.

FIELD OF TECHNOLOGY

The present disclosure pertains to three-dimensional printing, and more specifically, but not by way of limitation, to systems and methods for three-dimensional (3D) printing using microwave assisted deposition (MAD).

SUMMARY

In one embodiment, the present disclosure pertains to a device comprising a reservoir of providing a thermoset; a microwave resonance cavity in fluid communication with the reservoir to receive the thermoset; and a controller comprising a processor and memory, the processor executing instruction stored in the memory to: cause the thermoset to be transferred from the reservoir to the microwave resonance cavity; cause a microwave source to provide microwave energy into the microwave resonance cavity to emit a localized field at a point of deposition as the thermoset exits the microwave resonance cavity to in-situ cure the thermoset; and translate the reservoir and the microwave resonance cavity as the thermoset is cured to produce a solidified thermoset object.

In one embodiment, the present disclosure pertains to a device comprising a spool of continuous fiber tow, a reservoir of thermoset resin (unless the fiber is precoated such as a prepreg tow), the fiber passing through the reservoir to be coated with the thermoset, a microwave resonance cavity that cures the thermoset coated fiber, and a sensor to measure the extrusion temperature during in-situ curing of the thermoset coated fiber.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure pertains to systems and methods that allow for three-dimensional (3D) printing of solid objects with a thermoset resin, referred to generally as microwave assisted deposition (MAD). The systems and methods herein can utilize MAD for direct ink write (DIW) 3D printing of thermoset materials. Some embodiments include a DIW print head for in-situ curing and 3D printing of thermoset resins and composites including continuous fiber composites. To be sure, in-situ curing can involve the delivering of microwave energy into a microwave resonance cavity to emit a localized field at a point of deposition as a thermoset exits the microwave resonance cavity to in-situ cure the thermoset.

Some embodiments described herein provide extrusion-based 3D printing of thermosetting polymers (thermosets) and thermoset-based composites. These composites can include nanocomposites. An example 3D printing method disclosed herein, such as DIW involves a polymer-based ink/paste deposited through a nozzle onto a substrate via digitally defined paths to fabricate 3D structures. In some embodiments, these structures can be printed layer-by-layer. An example advantage of the MAD systems and methods disclosed includes a novel method to rapidly cure thermoset resin materials during the DIW 3D printing process. An example method utilizes a localized microwave field produced by a coaxial resonator that is placed in close proximity to the thermoset resin or (nano)composite paste at a point of deposition of the thermoset. The microwave field rapidly heats the thermoset, accelerating the chemical reaction and solidifying (in-situ curing) the material in the time range of microseconds to seconds.

These systems and methods unlock scalable 3D printing of several different types of thermoset resins such as rubbers including silicones, polyurethanes, ethylene propylene diene monomer (EPDM), and so forth. Other materials that can be processed include, but are not limited to epoxies, phenolics, cyanate esters, bismaleimides, polyimides, vinyl esters, polyesters, and so forth.

The systems and methods can advantageously facilitate the 3D printing of an unlimited number of layers capable without collapsing or wetting on the substrate or print bed. The systems and methods can eliminate the need to cure the 3D printed part after printing (however, post-curing may offer advantages for some materials and applications). The systems and methods can improve the DIW of overhangs and bridging capabilities to unlock 3D printing of complex part geometries.

Thermoset resin-based (nano)composites containing nanoparticle/microparticle filler materials mixed or dispersed within the resin may also be 3D printed with MAD. The resulting (nano)composite inks often include improved rheological behavior to facilitate 3D printing. Some filler materials like carbon nanotubes, chopped/milled carbon fibers, carbon black, graphene can heat rapidly under microwave irradiation which can accelerate the curing during MAD. Thermoset resin-based composite formulations have been designed to optimize the rate of in-situ curing, including tailoring the electrical conductivity and dielectric properties of the resin to enhance coupling with the microwave field.

Additionally, the microwave coaxial resonator has been designed around the point of deposition of the resin, taking the form of a compact yet scalable nozzle (MAD nozzle). The MAD nozzle can be adjacent to or integrated directly with a material deposition nozzle. A material deposition nozzle is a component that is coupled with an inner conductor. For example, the nozzle can fit inside the inner conductor concentrically.

The material deposition nozzle is placed inside the inner conductor of a microwave coaxial resonator. A terminal end of the material deposition nozzle can be located co-planar or slightly protruded below the open end of the microwave coaxial resonator of an example nozzle.

The microwave field produced by the MAD nozzle is a concentrated standing wave that does not significantly propagate outwards. The microwave heating system includes a resin temperature measurement device or sensor that uses a feedback control loop to precisely vary the power of the solid-state microwave source to control the thermoset resin extrusion temperature.

Example Embodiments

Figure 1:
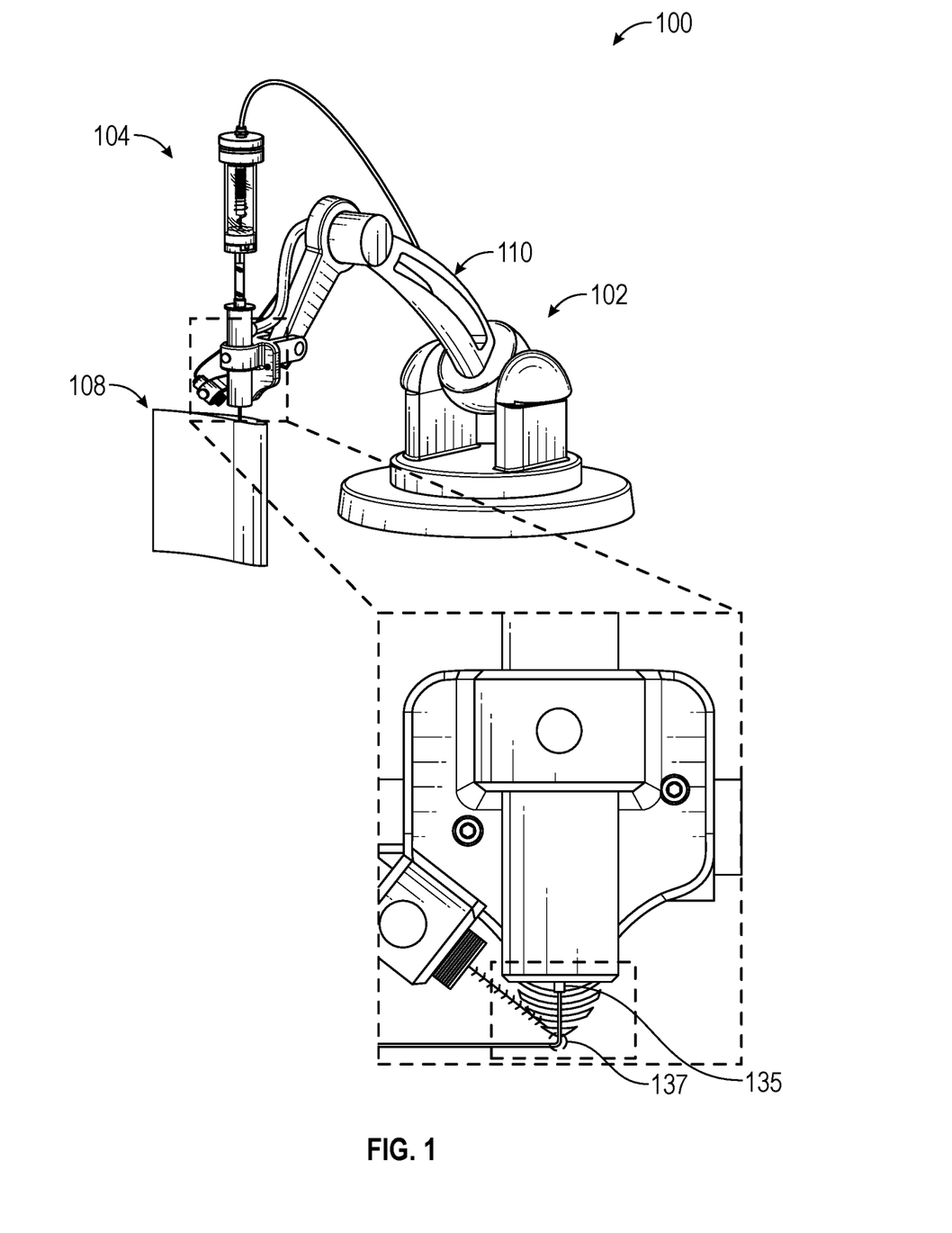
FIG. 1 is a perspective view of an example system of the present disclosure that includes a robotic platform and microwave deposition assembly.
Figure 2:
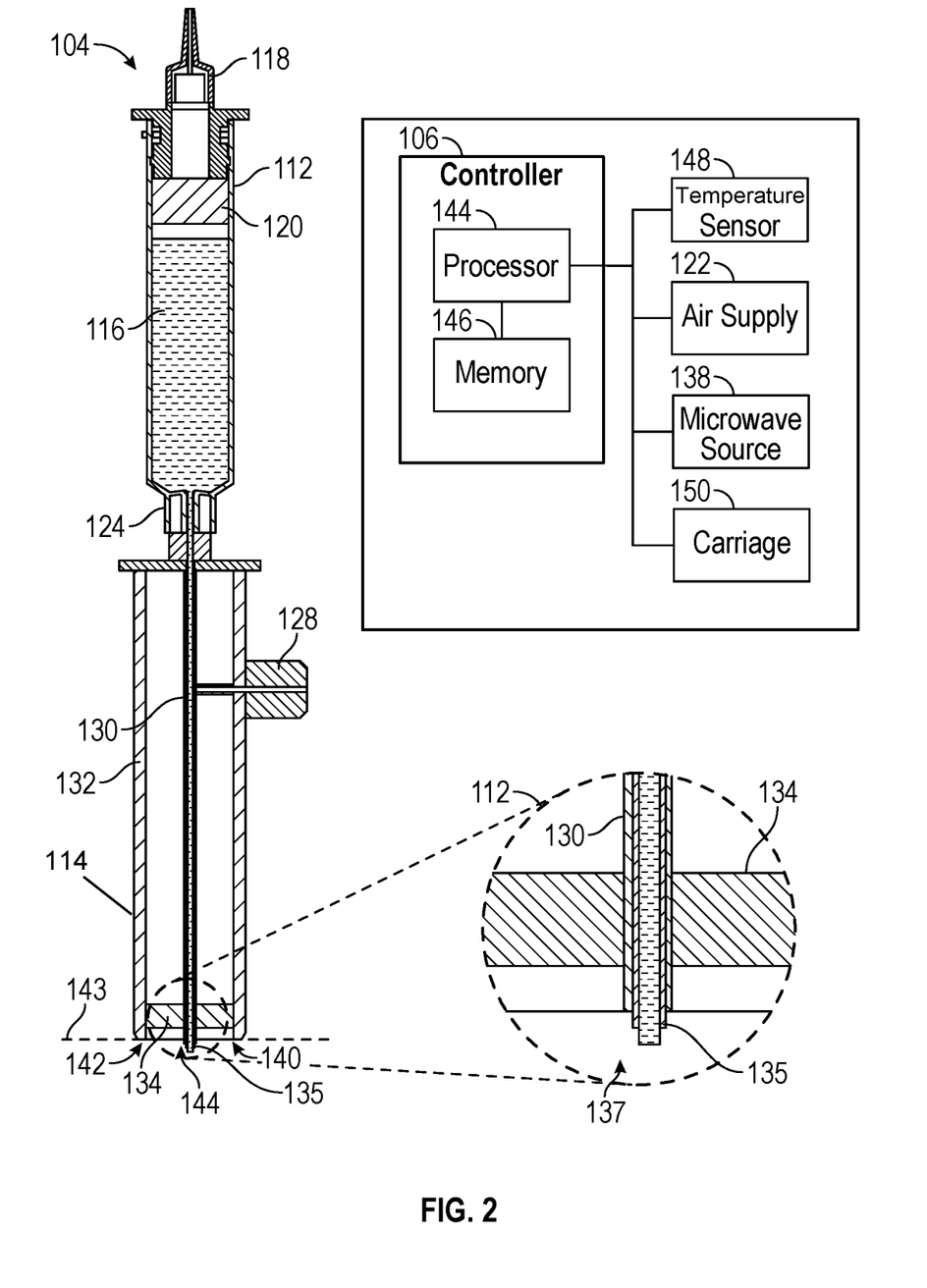
FIG. 2 is a cross-sectional view an example microwave deposition assembly in combination with a schematic view of components of the example microwave deposition assembly.

Referring now to FIGS. 1 and 2 collectively, where FIG. 1 is a perspective view of an example system 100 or device of the present disclosure. The system 100 is embodied as a robotic printer. The system 100 includes a frame 102, a MAD assembly 104, and a controller 106 (see FIG. 2), which are used to print an object 108 using DIW. The frame 102 can include an articulated robot arm 110 used to position the MAD assembly 104.

The MAD assembly 104 can comprise a reservoir 112 and a coaxial resonator 114 (also referred to as a microwave resonance cavity). In general, the reservoir 112 can hold a target material such as a thermoset 116. In one embodiment, the reservoir 112 is a syringe-style reservoir. The reservoir 112 comprises a fluid port 118 that can comprise or be associated with a valve that is used to drive air into the reservoir 112. When air pressure is increased, the air pushes the thermoset 116 out of the reservoir 112 and into the coaxial resonator 114. In one embodiment, a compressed air supply 122 can be used to deliver the air 120. The valve associated with the fluid port 118 can be connected to an air line between the fluid port 118 and the compressed air supply 122. The valve can be controlled via the controller 106, as will be discussed in greater detail infra.

Figure 4:
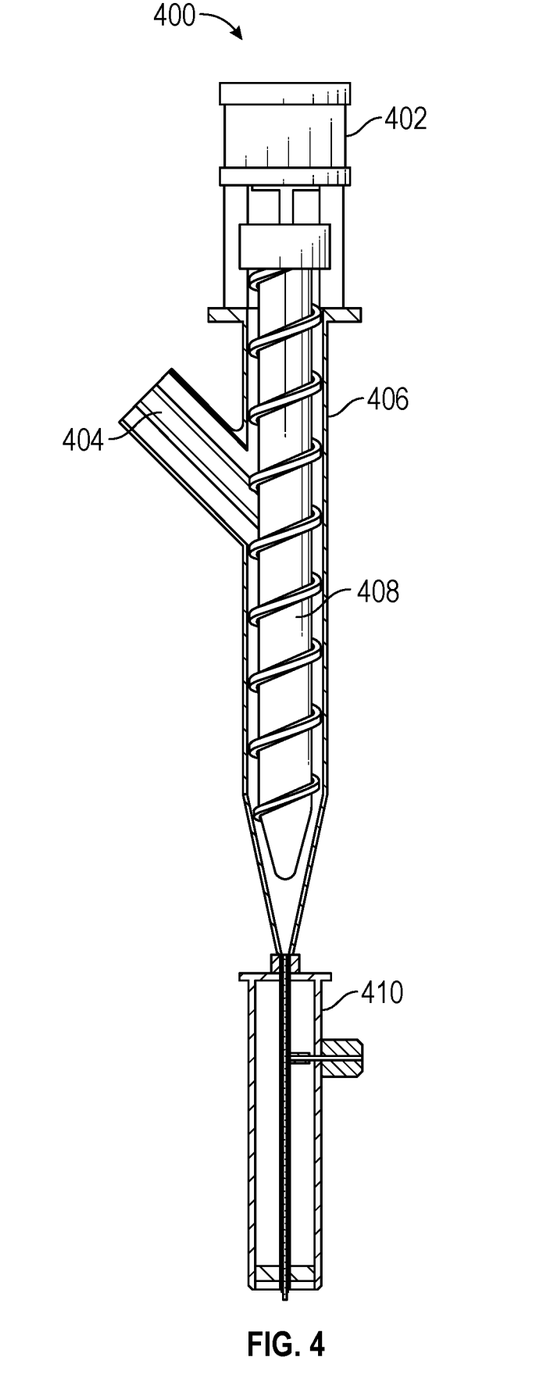
FIG. 4 illustrates an example assembly comprising an auger that can be used in combination with an example microwave deposition assembly.
Figure 5:
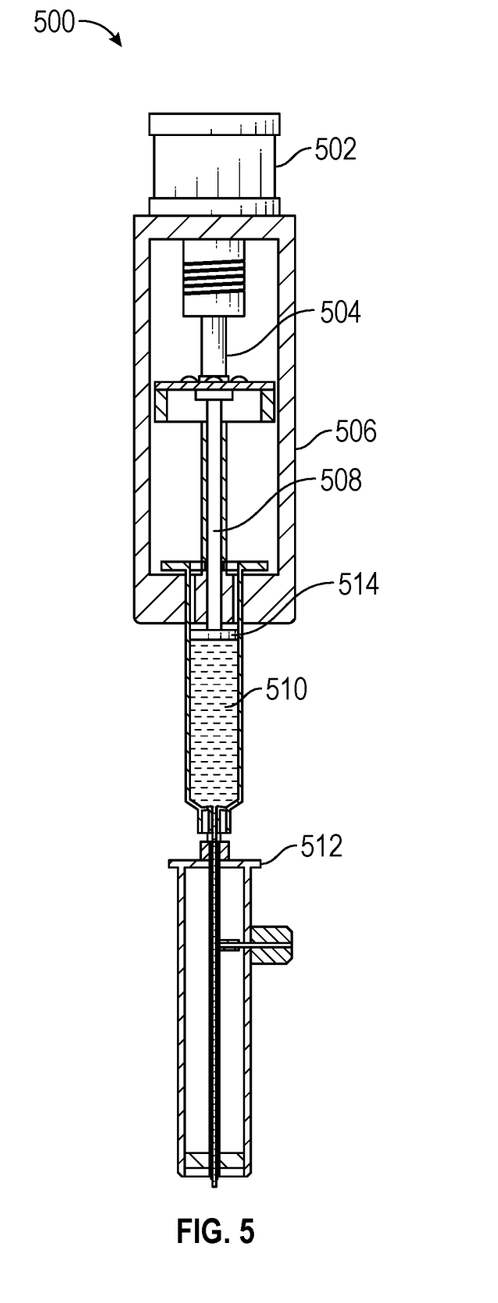
FIG. 5 illustrates an example assembly comprising a plunger that can be used in combination with an example microwave deposition assembly.

In some embodiments, the material inside the reservoir may be displaced and extruded by mechanical means. In one example, such as the embodiment of FIG. 4, the reservoir may contain an auger screw 408 controlled by a motor 402 in communication with the controller 106 to extrude the thermoset. Material may be transferred into the reservoir 406 though the material inlet 404 during extrusion by methods including pneumatics, peristaltic pumping, and more. In another example, as illustrated in FIG. 5, the reservoir may contain a plunger mechanically actuated by a motor 502 in communication with the controller 106 to apply pressure to the material in the reservoir 510 and extrude the thermoset.

The thermoset can include thermoset resins such as rubbers including silicones, polyurethanes, ethylene propylene diene monomer (EPDM), and so forth. Other materials that can be utilized include, but are not limited to, epoxies, phenolics, cyanate esters, bismaleimides, polyimides, vinyl esters, polyesters, and so forth. The thermoset may include filler particles such as CNPs, nanoclay, microballoons, chopped/milled fibers, and other nanoparticles/microparticles to tailor material properties. The thermoset can be 3D printed using a print head that includes a coaxial resonator 114 (microwave resonator cavity) that sets the thermoset as it is pushed out of the reservoir 112 and extruded from the material deposition nozzle to form the object 108.

In some embodiments, the reservoir 112 can couple to the coaxial resonator 114 using a locking mechanism 124, such as a Luer lock. The coaxial resonator 114 can comprise a coaxial connector 128, an inner conductor 130, an outer conductor 132, a centering disk 134, and a material deposition nozzle 135.

The inner conductor 130 includes a tubular or annular member that allows the thermoset to pass through. That is, the material deposition nozzle inside the inner conductor 130 provides a pathway for the communication of thermoset from inside the reservoir 112 out of the coaxial resonator 114. The inner conductor 130 extends centrally through outer conductor 132 in some embodiments. The inner conductor 130 is fixed in its relative position within the outer conductor 132 using the centering disk 134. In some embodiments, a centering disk is not required as long as the inner conductor is concentric with the outer conductor. It will be understood that a short circuit can be created at a top end of the coaxial resonator where the outer conductor 132 is brought in contact with the inner conductor 130 with a conductive horizontally flat surface.

In some embodiments, the coaxial connector 128 is in mechanical and electrical communication with the inner conductor 130. The coaxial connector 128 couples with a microwave source 138. Type N coaxial cable can be used to connect the MAD assembly 104 to the microwave source 138. Other types of cables can be used, as would be appreciated by one or ordinary skill in the art.

To handle the expected microwave power delivery of up to 250 Watts (not intended to be limiting) the coaxial connector 128 and the inner conductor 130 can be constructed of copper for enhanced electrical conductivity and heat dissipation. For context, microwaves (generally defined as frequencies between 300 MHz and 300 GHz) are a subset of the radio frequency spectrum. The devices and systems disclosed can be configured to be operated at frequencies outside the microwave range.

One or ordinary skill in the art will appreciate that other materials can also be used. In one embodiment, the nozzle 135 diameter is less than one millimeter, the overall diameter of the resonator may be about five to fifteen millimeters in diameter.

One example design of the coaxial resonator 114 is based on a coaxial resonator cavity similar to those used for atomic emission spectrometry (AES) applications. The coaxial resonator 114 produces a strong electric field at an open end/terminal end of the resonator body near a terminal end of the coaxial resonator 114. That is, the inner conductor 130 has a terminal end 140 at the open end/terminal end of the coaxial resonator 114. In some embodiments, a material deposition nozzle such as a syringe needle of various diameters is placed inside the inner conductor to transfer material from the reservoir through the coaxial resonator and extruded at or near the reference plane 143.

The material deposition nozzle 135 is coupled to the terminal end of the inner conductor 130. The material deposition nozzle 135 can include a tubular member that is configured to mate with the inner conductor 130. As noted above, this can include a shape such as a syringe needle or a tubular extrusion with a diameter. The diameter of the material deposition nozzle 135 can be uniform along its length. In another embodiment, the diameter of the material deposition nozzle 135 can vary along its length. For example, the diameter of the material deposition nozzle 135 can be larger at the point at which it interfaces with the inner conductor 130 and smaller towards a terminal end where the thermoset is extruded.

In one embodiment, the material deposition nozzle 135 can be inserted into the inner conductor 130 such that the material deposition nozzle 135 contacts an inner surface of the inner conductor 130. The material deposition nozzle 135 can be sized to fit over the end of the inner conductor 130 like a cap, such that the material deposition nozzle 135 contacts the outer surface of the inner conductor 130. As noted above, the material deposition nozzle 135 provides a path for thermoset flowing through the inner conductor 130 that is extruded out of the material deposition nozzle 135 at a point of deposition 137.

In some embodiments, the material deposition nozzle 135 is manufactured from a material that is not susceptible to microwave energy. For example, the material deposition nozzle 135 can be manufactured from a ceramic, glass, or other non-conductive/low dielectric loss material.

In some embodiments, the terminal end 140 of the material deposition nozzle 135 is coplanar and/or substantially/approximately coplanar with a terminal end 142 of the outer conductor 132. For example, the terminal end 140 of the inner conductor 130 can align with a reference plane 143 that is coplanar with the terminal end 142 of the outer conductor 132. In some embodiments, the material deposition nozzle 135 can protrude below the reference plane 143 at a distance. The exact distance of this protrusion can be selected by a user.

In some embodiments, the terminal end of the material deposition nozzle 135 can be slightly recessed inside the terminal end of the outer conductor 132. Again, the terminal end of the material deposition nozzle 135 can slightly protrude beyond the terminal end of the outer conductor 132.

The electric field can efficiently couple to any dielectric thermoset flowing from the coaxial resonator 114, assuming the dielectric thermoset possesses a sufficiently high dielectric loss factor. In some embodiments, nanoparticles can be included in the thermoset. It will be understood that nanocomposites containing dispersed carbonaceous nanoparticles (CNPs) such as carbon nanotubes, graphene, carbon black, carbon nanofibers, etc. exhibit beneficial properties to couple well to the microwave field and rapidly heat when extruded from the coaxial resonator 114.

In some embodiments, the coaxial resonator 114 is configured to resonate at or about 2450 MHz (confirmed with a vector network analyzer) and about a 50 Ohm impedance for compatibility with a standard microwave power source and power delivery components. When other resonance values are desired, changes to the coaxial resonator 114 can be used. For example, designing for resonance can be accomplished by varying a geometry of the inner conductor 130 and/or outer conductor 132, such as its overall length and location of the coaxial connector 128.

The coaxial resonator 114 has a high quality-factor and therefore may be frequency sensitive. Consequently, slight variations in the resonator geometry or extrudate dielectric properties can shift the resonant frequency of the coaxial resonator 114. The coaxial resonator 114 geometry on can be fixed and not capable of being tuned once construction is complete. However, in some embodiments, the coaxial resonator 114 geometry can be adjustable to allow the user to alter the protrusion length of the inner conductor 130 beyond the outer conductor 132 to vary the location of the localized microwave field with respect to the material extrusion point (e.g., where a terminal end of the material deposition nozzle is located).

To ensure a good impedance match and efficient microwave coupling a solid-state microwave generator can be used as the microwave source 138. The advantage of this type of source over magnetron-based microwave sources is that it is frequency agile and can be precisely tuned to an output frequency that exactly matches the resonant frequency of the coaxial resonator 114. This frequency tuning is controlled automatically by the solid-state microwave source. Operations of the microwave source 138 can be guided by the controller 106.

CNPs may be directly mixed into the thermoset resin by hand or using any other nanoparticle dispersion technique. Nanoparticle dispersion techniques include but are not limited to ultrasonication, solvent-based dispersion, roller milling, centrifugal mixing, and more.

As noted above, aspects of the system 100 can be controlled using the controller 106. In some embodiments, the controller 106 can comprise a processor 144 and memory 146. The memory stores instructions that can be executed by the processor 144 to perform any of the methods disclosed herein. It will be understood that when references are made to operations performed by the controller 106, this implicitly includes the execution of instructions in memory 146 by the processor 144.

In various embodiments, the controller 106 can be configured to control the valve to introduce air into the reservoir 112. That is, the controller 106 can introduce air into the reservoir 112. Air introduced into the reservoir 112 pushes the thermoset into the material deposition nozzle through the inner conductor 130 of the coaxial resonator 114. As the thermoset is extruded from the material deposition nozzle, the controller 106 can control the microwave source 138 to emit microwave radiation into the coaxial resonator 114. That is, microwave radiation is transmitted through the coaxial connector 128 inside the outer conductor 132. The microwave radiation is radiated or propagated along the length of the outer conductor 132. The microwave radiation is focused as a standing wave at the end of the terminal end 142 of the outer conductor 132. To be sure, the microwave radiation is focused at a terminal end of the material deposition nozzle 135 where the thermoset is extruded. The microwave radiation hardens the thermoset that is extruded out of the inner conductor 130. Again, this process is called in-situ hardening of the thermoset.

In some embodiments, the controller 106 can receive sensor output from a temperature sensor 148 that is positioned near the terminal end of the coaxial resonator 114. As microwave radiation propagates from the coaxial resonator 114 to harden the thermoset, the temperature sensor 148 detects the temperature of the extruded thermoset material after being heated by the microwave field. The temperature sensor 148 can include an infrared sensor, thermocouple, thermal camera, etc. to measure the temperature of the extruded material when curing the thermoset. The controller 106 is configured to obtain output from the sensor and selectively adjust an operating parameter of a microwave source 138 to vary the microwave power applied and tune the rapid heating of the thermoset. For example, the heating rate of the microwave source 138 is a tunable parameter. For example, the controller 106 could change a wavelength used by the microwave source 138. The controller 106 could change a power setting and/or frequency used by the microwave source 138 in another example.

Figure 7:
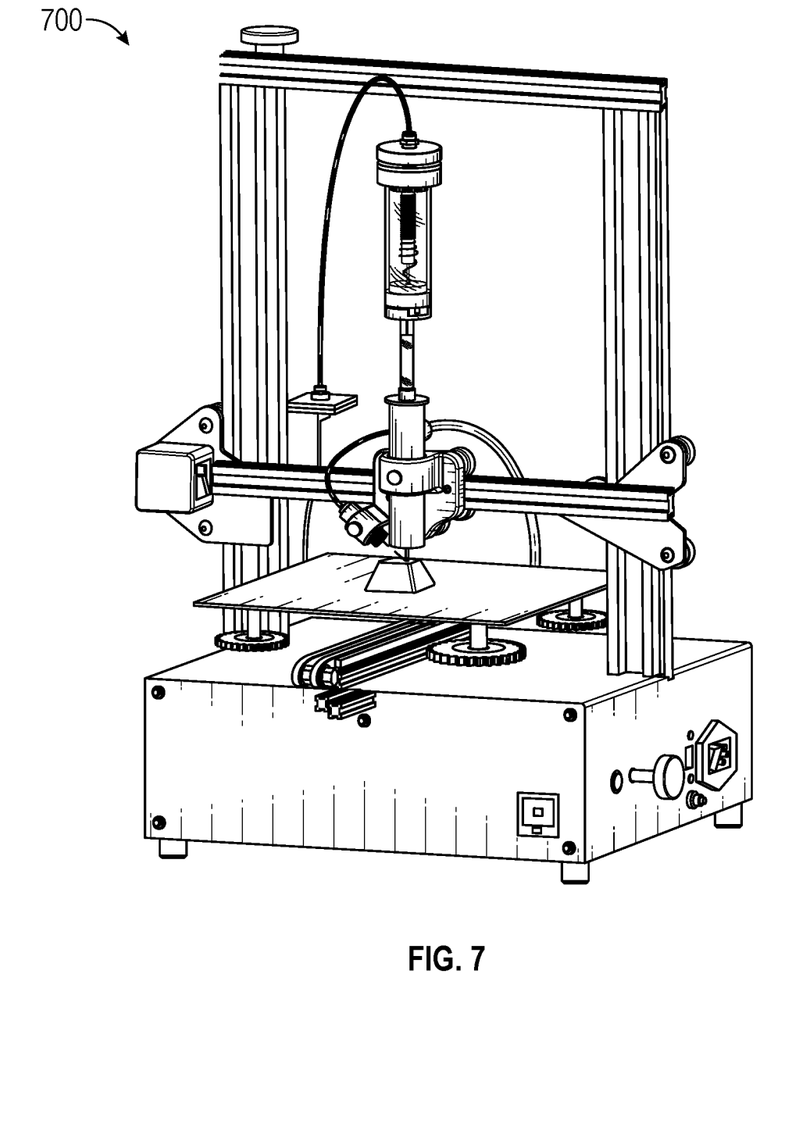
FIG. 7 is a perspective view of an example system of the present disclosure that includes a three-dimensional printer.

Additionally, the controller 106 can control movement of the MAD assembly 104. In general, the controller 106 can control movement of at least the reservoir 112 and the coaxial resonator 114. In the example of FIG. 1, the controller 106 can control movement of the articulated robot arm 110. The MAD assembly 104 is associated with the articulated robot arm 110. The controller 106 can control movement of the MAD assembly 104 according to a model. For example, the controller 106 can move the MAD assembly 104 in accordance with a three-dimensional model or plan. As the controller 106 moves the MAD assembly 104, the controller 106 can deposit and cure the thermoset to build the object 108. Thus, the system 100 can create a three-dimensional thermoset object. In one embodiment, the MAD assembly 104 is associated with a carriage 150 or another platform that can be caused to move by the controller 106. The design of the carriage 150 can vary based on the underlying embodiment of the system. In FIG. 1, the carriage 150 is the articulated robot arm and any other associated hardware that is used to move the MAD assembly 104. Another example platform or system that can be used with the MAD assembly 104 includes a 3D printer, such as the example embodiment in FIG. 7. The 3D printer may include various 3D printer configurations including cartesian, delta, polar, coreXY, H-Bot, and more.

Figure 6:
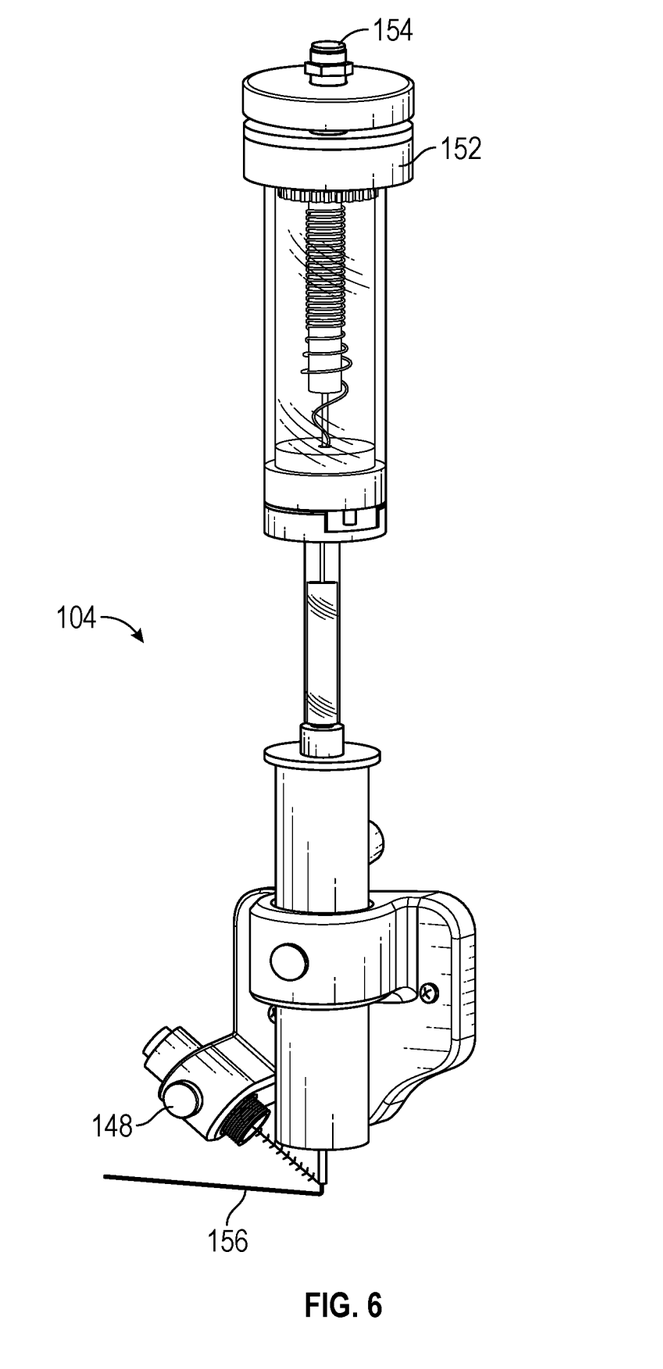
FIG. 6 is a perspective view of another example microwave deposition assembly that includes a carbon fiber spool.

Referring now to FIG. 6, a spool 152 can be associated with the MAD assembly 104 to build an object with continuous fiber embedded in a thermoset. The spool 152 is coupled to a top of the reservoir 112. The fiber in the spool 152 can be dispensed by application of air pressure from the air supply 122 or extruded mechanically with motors, rollers, or tension in the continuous fiber. The spool 152 can include an air inlet 154, which can comprise a controllable valve associated with the air supply 122 that can be opened/closed by the controller 106.

In some instances, the fiber is drawn through the thermoset in the reservoir 112, which coats the fiber in thermoset. In some instances, the fiber will be precoated with a thermoset resin (prepreg tow) and in this case a reservoir 112 may not be used. It will be understood that the addition of the spool 152 is optional. Thus, the spool and MAD assembly 104 combination may be referred to as a MAD-Fiber printhead. The MAD-Fiber printhead is capable of in-situ curing thermoset coated continuous fiber (TCCF). The continuous fiber may be made of several different materials including but not limited to carbon, glass, aramid, or natural fiber such as wood, sisal, hemp, coconut, kenaf, fax, jute, abaca, banana leaf, bamboo, wheat straw, and more. Continuous carbon fiber converts microwave energy into heat which can help cure the thermoset.

The continuous fiber thread passes through a thermoset resin reservoir. In some instances, the thermoset contains dispersed CNPs to enhance microwave coupling of the resin. The carbon fiber is coated with the thermoset material and passes through the MAD assembly 104 where it is output as a printed and cured TCCF 156. As with other embodiments, the sensor 148 can be configured to sense the temperature of the thermoset as it is being extruded and cured. The output of the sensor 148 can be used to selectively control at least one operating parameter of the microwave source, such as frequency, power, and so forth.

The material formulation including choice of thermoset (i.e., epoxy), amount and type of CNPs (i.e., carbon nanotubes), and material type and size of continuous fiber (i.e., 6K carbon fiber tow) can be optimized for various applications. MAD-Fiber print settings can be optimized (and automatically controlled through use of the controller 106 (see FIG. 1)) including the extrusion temperature, print speed, extrusion pressure, and so forth, to 3D print composite parts. Notably, the dielectric properties of the continuous fiber, the epoxy matrix, and the dispersed CNPs can be utilized to tailor the in-situ microwave-curing capabilities of the MAD nozzle.

Figure 3:
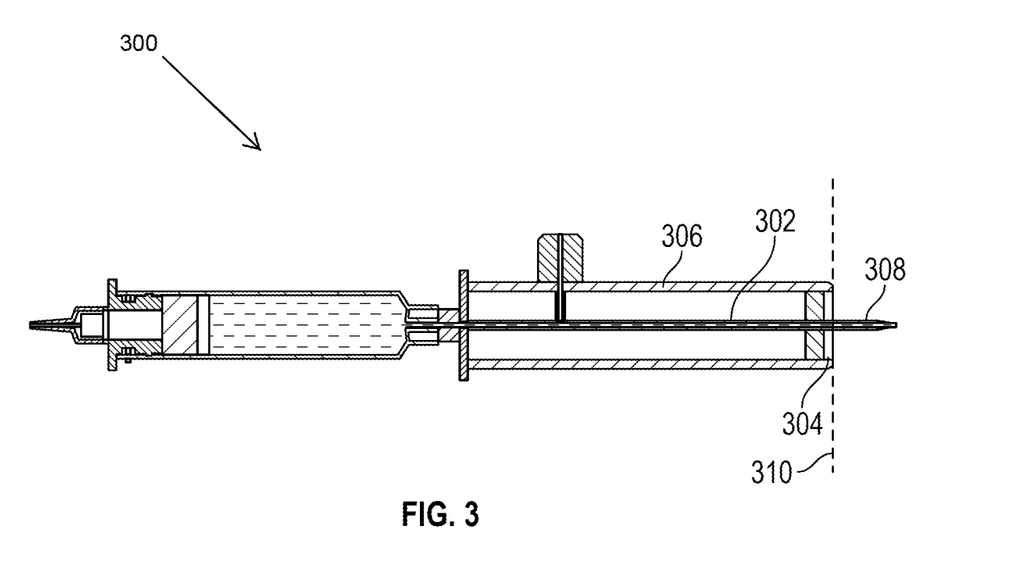
FIG. 3 is a cross-sectional view another example microwave deposition assembly.

FIG. 3 is a cross-sectional view of another example MAD assembly 300. In this example the material deposition nozzle can extend or protrude from a terminal end 304 of an outer conductor 306. That is, a terminal end 308 of the material deposition nozzle is not coplanar with a reference plane 310 that is aligned with the terminal end 308 of the inner conductor 302. FIG. 4 illustrates another example assembly 400 that includes an extruder in the form of an auger or screw. The assembly 400 generally includes a motor 402 in combination with a reservoir 406. The reservoir 406 includes a material inlet 404, and an auger 408. The assembly includes a MAD assembly 410 that is similarly or identically constructed to the MAD assembly 104 disclosed above. In some embodiments, the auger 408 and reservoir 406 are tapered similarly to a nozzle to funnel material downwardly. The motor 402 can be controlled by a controller (see controller 106 of FIG. 2) to turn the auger 408. The rotational speed of the auger 408 dictates (in part) the pressure applied to extrude the material in the reservoir 406, such as a thermoset. Material can be introduced into the reservoir 406 through the material inlet 404. Thus, the material can be periodically and/or continually fed into the reservoir 406 through an outside source that provides the material into the material inlet 404. The motor 402 includes an electronic stepper motor that turns the auger 408, causing the material in the reservoir 406 travel through the MAD assembly 410. As noted above, the material is cured, in-situ using microwaves.

FIG. 5 illustrates another example assembly 500 that includes an extruder in the form of a plunger. The assembly 500 includes a motor 502, a lead screw 504, a mounting assembly 506, a plunger 508, a reservoir 510, and a MAD assembly 512. The motor 502 can include an electronic stepper motor (or other equivalent) that is coupled to the mounting assembly 506. The motor 502 tuns the lead screw 504, which imparts downward force onto the plunger 508. The plunger 508 exerts a force on a cap 514 in the reservoir 510. The cap 514 translates linearly into the reservoir causing material to be extruded through the MAD assembly 512, similar to a syringe. As with other embodiments, the motor 502 can be controlled via a controller (see controller 106 of FIG. 2).

Figure 8:
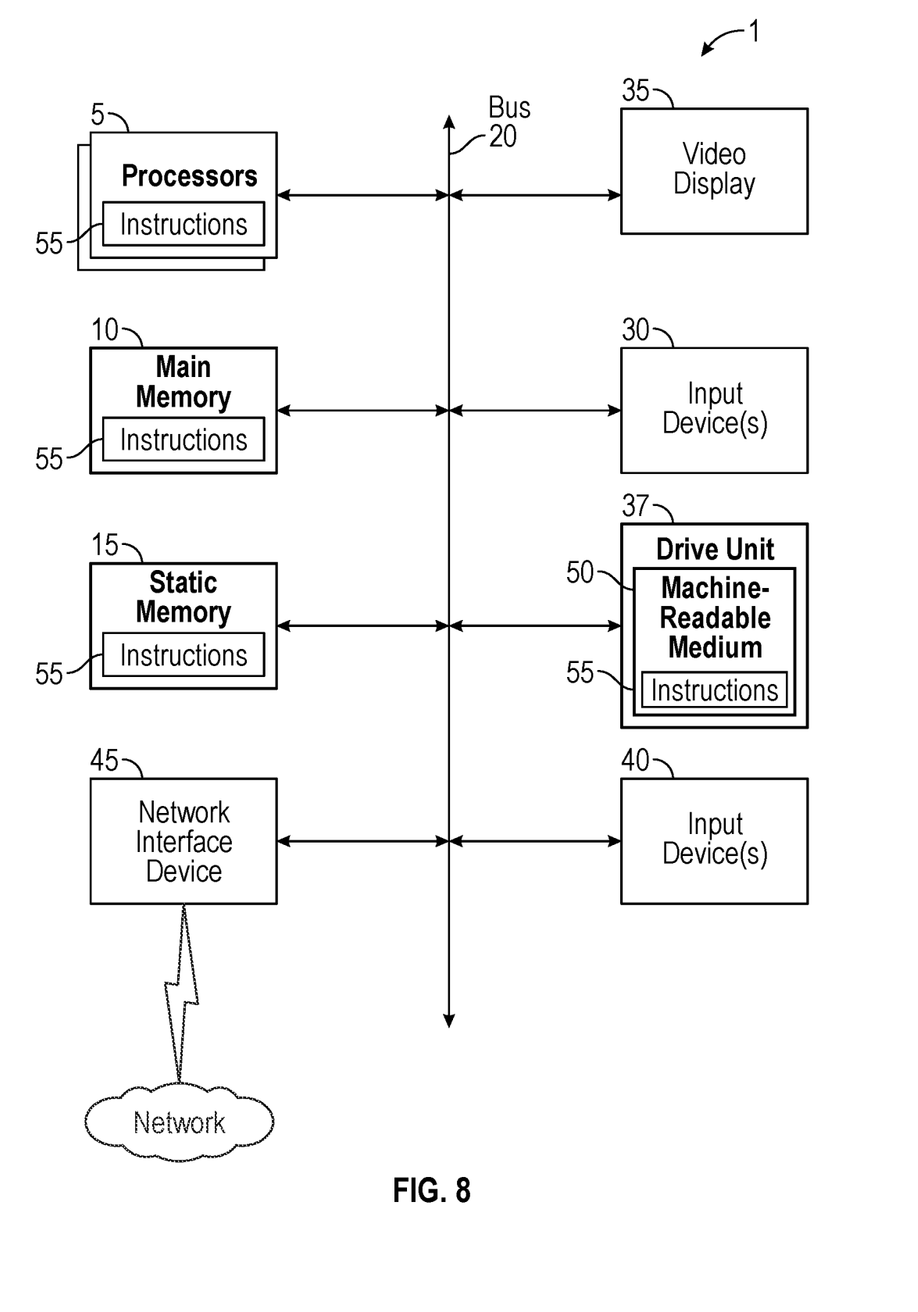
FIG. 8 is a schematic diagram of an example computer system that can be used in the present disclosure.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically/physically connected. The terms "couple" and "coupling" are also used in a non-mechanical/physical context that refers to absorption of microwave energy by a material. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an", and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system comprising:
   a reservoir for receiving a thermoset;
   a microwave resonance cavity comprising an outer conductor and a tubular or annular inner conductor, said inner conductor comprising a nozzle disposed therein through which the thermoset can pass, said nozzle in fluid communication with said reservoir to receive the thermoset;
   a controller comprising a processor and memory, said processor executing instruction to:
      cause the thermoset to be transferred from said reservoir to said microwave resonance cavity; and
      cause a microwave source to provide microwave energy into said microwave resonance cavity to produce a standing wave at a point of deposition to heat the thermoset after the thermoset exits said microwave resonance cavity, accelerating the chemical reaction and solidifying the thermoset.

2. The system according to claim 1, further comprising a sensor that detects a temperature of the thermoset that has been heated by said microwave resonance cavity.

3. The system according to claim 2, wherein said controller is configured to obtain output from said sensor and selectively adjust an operating parameter of said microwave source.

4. The system according to claim 1, wherein the thermoset comprises a resin.

5. The system according to claim 1, wherein said system further comprises a connector that couples said outer conductor with said microwave source.

6. The system according to claim 1, wherein a terminal end of said inner conductor is coplanar with a terminal end of said outer conductor.

7. The system according to claim 1, further comprising a stabilizing disk that fixes a position of said terminal end of said inner conductor relative to said terminal end of said outer conductor.

8. The system according to claim 1, further comprising an air supply device for delivering a volume of air into said reservoir to extrude the thermoset.

9. The system according to claim 1, wherein said nozzle is coplanar with said terminal end of said inner conductor.

10. The system according to claim 1, wherein said nozzle protrudes beyond said terminal end of said inner conductor and said outer conductor.

11. The system according to claim 1, wherein said reservoir and microwave resonance cavity are in communication with a 3D printer.

12. The system according to claim 1, wherein said controller provides instruction to said reservoir and said microwave resonance cavity as the thermoset is cured.

13. The system according to claim 1, wherein the microwave energy is provided immediately after the thermoset exits said microwave resonance cavity at said point of deposition.

14. The system according to claim 1, wherein the thermoset comprises a composite.

15. The system according to claim 1, wherein the thermoset comprises a nanocomposite.

16. The system according to claim 1, wherein the thermoset comprises a carbonaceous material.

17. The system according to claim 1, wherein the thermoset further comprises a filler material.

18. The system according to claim 17, wherein the filler material comprises particles.

19. The system according to claim 17, where the filler material comprises fibers.

20. The system according to claim 17, where the filler material comprises carbonaceous nanoparticles (CNP).

21. The system according to claim 17, where the filler material comprises nanoclay.

22. The system according to claim 17, where the filler material comprises microballoons.

23. The system according to claim 1, further comprising a pneumatic for extruding the thermoset.

24. The system according to claim 1, further comprising a peristaltic pump for extruding the thermoset.

* * * * *